Sept. 30, 1958

R. W. DE LANCEY 2,854,533

ELECTRICAL SWITCHES

Filed Jan. 23, 1956

INVENTOR
RALPH W. DE LANCEY
BY
ATTORNEY

Sept. 30, 1958

R. W. DE LANCEY 2,854,533

ELECTRICAL SWITCHES

Filed Jan. 23, 1956

INVENTOR
RALPH W. DE LANCEY
BY
ATTORNEY

RUN POSITION

INVENTOR
RALPH W. DeLANCEY
BY
ATTORNEY

Sept. 30, 1958 R. W. DE LANCEY 2,854,533
ELECTRICAL SWITCHES
Filed Jan. 23, 1956 10 Sheets-Sheet 7

INVENTOR
RALPH W. DELANCEY
BY
ATTORNEY

Sept. 30, 1958 R. W. DE LANCEY 2,854,533
ELECTRICAL SWITCHES
Filed Jan. 23, 1956 10 Sheets-Sheet 8

INVENTOR
RALPH W. DELANCEY
BY
ATTORNEY

Sept. 30, 1958  R. W. DE LANCEY  2,854,533
ELECTRICAL SWITCHES

Filed Jan. 23, 1956  10 Sheets-Sheet 9

INVENTOR
RALPH W. DeLANCEY
BY
ATTORNEY

Sept. 30, 1958

R. W. DE LANCEY 2,854,533

ELECTRICAL SWITCHES

Filed Jan. 23, 1956

INVENTOR
RALPH W. DeLANCEY
BY
ATTORNEY

United States Patent Office 2,854,533
Patented Sept. 30, 1958

2,854,533

ELECTRICAL SWITCHES

Ralph W. De Lancey, Rockford, Ill., assignor to Controls Company of America, Schiller Park, Ill., a corporation of Delaware Application January 23, 1956, Serial No. 560,652

8 Claims. (Cl. 200—6)

This invention relates to electric switches and more specifically to a novel and improved sequence switch for controlling electric circuits in a predetermined manner and to improved contact supporting and operating structures therefor. This application constitutes a continuation in part of my application for U. S. patent, Serial No. 448,966, filed August 10, 1954, entitled "Electric Control Devices."

In the control of a plurality of electric circuits it is often necessary to control not only the sequence of operation but also the time intervals between the operation of the several circuits. Both factors are particularly important for instance in the starting and stopping of oil burning equipment in order to insure safe and dependable operation. Another important consideration in the control of oil burners as well as a variety of other types of equipment resides in effecting the desired sequential control in response changes in magnitude of a physical or electrical condition. With oil burning equipment it is necessary upon starting the burner for instance to initiate the oil supply and ignition and upon a predetermined increase in stack temperature caused by operation of the burner, cut off the ignition and disconnect safety cutoff devices so that the burner will continue to run.

Switches in accordance with the invention provide highly dependable, stable and economical means for the attainment of the foregoing ends and may be readily adapted to effect various desired sequential actions. In oil burner applications wherein the switch is actuated in response to temperature changes, accurate adjustments may be provided for controlling the time during which ignition system is energized, the operation of safety circuits and the like and the temperature range for complete cycling of the switch.

Another object of the invention resides in the provision of an improved rotary sequence switch so arranged and designed to provide a wide range of contact operation and control.

Still another object of the invention is a new and improved sequence switch for primary controls in oil burning equipment embodying means responding immediately to improper burner operation, flame failure and extinguishment, power failure and the like, to stop the burner and prevent reignition until safe starting conditions have been reestablished. This is very important in the case of so-called gun type or other burners which atomize the fuel to secure more effective and efficient burning.

Still another object of the invention resides in an improved control switch for effecting the desired sequence of operation of the oil burner components that is characterized by its simplicity, dependability and ease of adjustment. Moreover, this improved switch embodies simple and effective adjustments to vary, for instance, the ignition time for the burner as well as the frictional coupling between the switch and a bimetallic controlling element. The improved structure of this switch, in combination with the bimetallic control element sensitive to stack temperatures, is not dependent on the absolute stack or other temperature to which it may be subjected, but rather functions as a result of temperature differences, up or down. While the temperature difference, for instance, to move the control switch from a normal running position to the restart position, is adjustable over a wide range, it can be reduced to a much smaller range than heretofore attainable, and with equal safety. This procedure avoids the necessity, when restarting conditions are otherwise safe, of waiting for the stack to cool to a predetermined temperature before restarting the oil burner.

Still another object of the invention resides in the arrangement and structure of the switch contacts to respond to relatively little motion of the bimetallic controlling element and effect a transfer, in the case of an oil burner control, from the so-called lock-out circuit to the normal "on" or "run" circuit in less than half the time heretofore required for the same operation, and thus prevent false lock-outs when the burner is operating properly.

A further object of the invention resides in a new and improved friction-operated switch and contact structure that provides for rapid make and break operation, wiping of the contacts on closure and opening, and the avoidance of a mechanical motion requiring relatively large effort. This switch may be adapted to respond to rotary motion of a cam, for instance, and function to operate substantially instantaneously on the reversal of motion thereof, while continued rotation will merely hold the contacts in the respective open or closed positions, depending upon the direction of rotation.

A still further further object of the invention is a new and improved contact supporting structure enabling accurate positioning of the contact assemblies relative to the cooperating cams to effect the desired frictional contact therebetween as well as the closure pressure of the contacts themselves.

The above and other objects and advantages of the invention will become more apparent from the following description and accompanying drawings which show for purposes of illustrating the invention several embodiments in which the invention may take form. It is to be understood that the drawings are illustrative of the invention rather than limiting the same.

While it will become more apparent as the description proceeds that the invention is generally useful for sequential control of electric circuits, the advantages and versatility of this switch are particularly evident when considered in connection with the stack switch, or primary delay control, for oil burning equipment. For this reason the control of oil burning equipment by means of this invention has been selected as a typical application.

Referring now to the embodiment of the invention shown in Figs. 1 to 16, the cam switch is generally denoted by the numeral 51 and in the case of oil burning equipment, it is actuated by a bimetallic member responsive to the temperature of the stack gases, as shown in the application above referred to. The switch is provided with two contact operating cams 65 and 68 adapted to be angularly shifted by the bimetallic element through a coupler 37 having a flared part 37' for receiving the drive shaft 34. The switch may be mounted in any suitable manner or may be fastened to a panel such as the panel 19 of the stack switch with a knob 49 on the outside of the panel and coupled with the cams for setting their relative positions preparatory to starting the burner.

More specifically the switch 51 comprises a body member 98 having two bifurcations 99 and 100 with holes 99' and 100' in line with the flattened driving means 34. The flattened tube or coupler 37 above referred to is secured to a flattened shaft 97 carrying the bushing 103 and cams 65 and 68 and extending through holes 99' and 100' and an opening in the front of panel 19 where it is secured to the knob 49.

The body 98 carries switch assembly 106 having contacts 63 and 64 and switch assembly 107 having contacts 76 and 77 with both assemblies cooperating with cam 65. It also carries switch assembly 108 having contacts 78 and 79 and switch assembly 109 having contacts 66 and 69 for cooperation with cam 68. Engagement of the shaft 97 with the cams 65 and 68 is accomplished by a cylindrical member or bushing 103 between the arms 99 and 100. This bushing has a hub portion 112 which in turn carries a rigid clutch element 104, a clutch spring 105 and the cams 65 and 68, and has, at the far end as viewed in Fig. 1, an annular flange 113. On the near side of the portion 112 is a section 114 of smaller diameter for engagement with cam 68 and having an annular groove 115 beyond this cam.

Figures 1, 2, 3, 4:
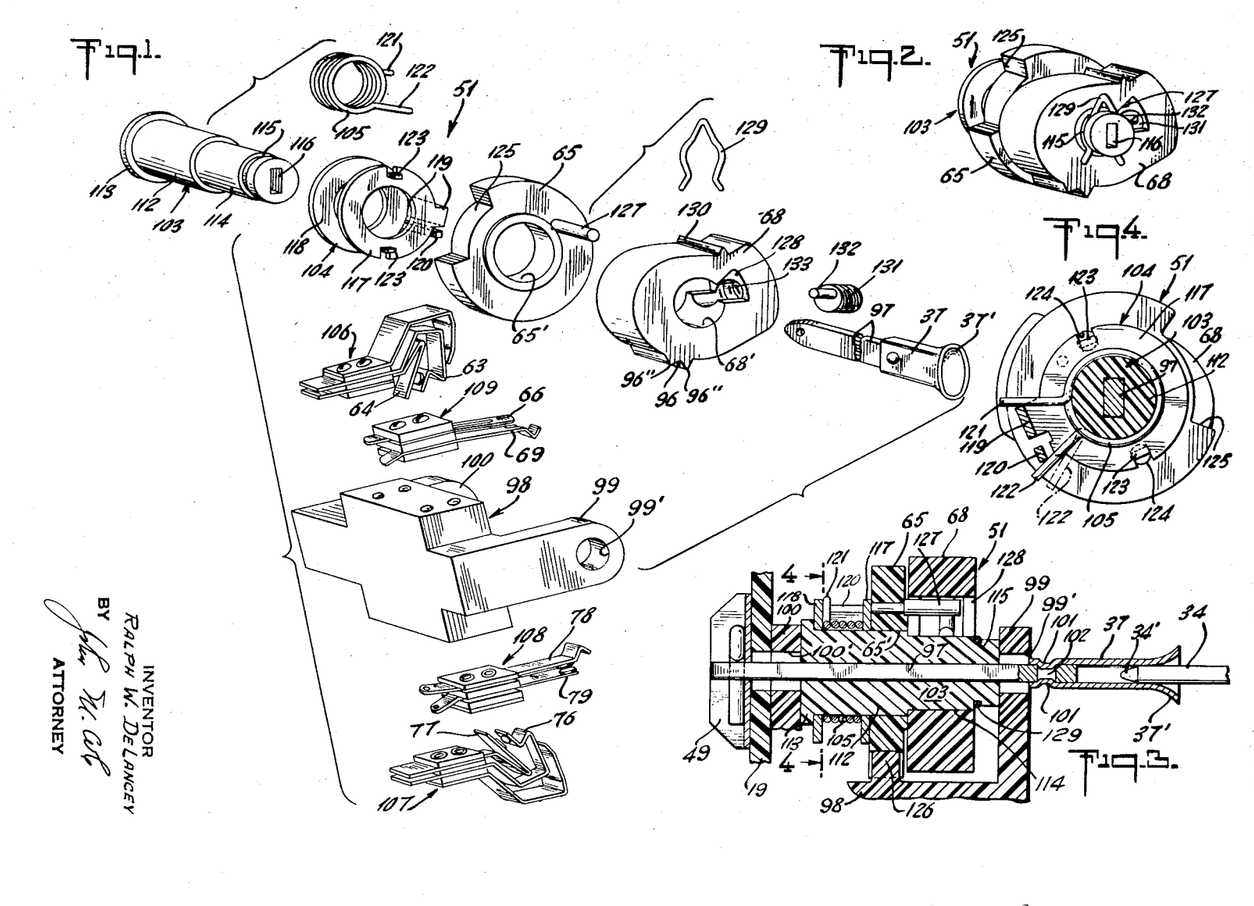
Fig. 1 is an exploded view, in perspective, of one embodiment of a sequence switch in accordance with the invention.
Fig. 2 is a perspective view of the cam members of the switch shown in Fig. 1 in a partially assembled condition.
Fig. 3 is a cros-sectional view of the assembled switch and taken along the line 3—3 of Fig. 5.
Fig. 4 is a fragmentary cross-sectional view of switch shown in Fig. 3 taken along the line 4—4 thereof.

The clutch assembly 104 and 105 engages the cylindrical part 112 of hub 103 and rides against the flange 113. Member 104 of the clutch comprises a pair of spaced, washer-like members 117 and 118 which are fixed one relative to the other by a bridging bracket member 119 preferably formed integrally with members 117 and 118. Parallel to the bridging bracket is an adjustable member 120 movable toward and away from bracket 119 to adjust the frictional engagement of clutch spring 105 with the surface 112 of member 103. This spring is positioned between the washer-like members 117 and 118 with the ends 121 and 122 thereof disposed on the outer sides of members 119 and 120, as shown in Figure 4. With this arrangement rotation of the drive member 103 will rotate the clutch 104—105 through the friction of spring 105 on surface 112 and the amount of friction can be readily varied by adjusting the spacing of members 119 and 120 disposed between the outer clutch members 117 and 118 (see Fig. 4). By moving the member 120 away from the member 119 for instance, the ends 121 and 122 of spring 105 will be separated to decrease the frictional engagement while movement of member 120 closer to member 119 will allow the ends of the spring to approach one another and increase the frictional engagement.

Cam 65 has a central concentric opening 65' proportioned to slideably engage the cylindrical surface 112 of the drive member 103 and is provided with a pair of openings 124 to receive a pair of outwardly extending lugs 123 formed integrally with the clutch 117. Rotation of the cam 65 and clutch part 104 on the bushing 103 is limited by a notch 125 and a cooperating stop 126 carried by the body 98 and shown in Fig. 5 of the drawings. The cooperating cam 68 is arranged to rotate relative to the section 114 of hub 103 and both cams are retained in position by a spring clip 129 engaging the groove 115. Cam 68 is driven by the cam 65 through a pin 127 carried by cam 65 and a cooperating arcuate slot 128 formed in the body of cam 68 and opening into the central opening 68'. The angular length of this slot 128 determines the movement of cam 65 before it in turn moves cam 68 on each reversal of rotation.

Figures 5, 15, 16:
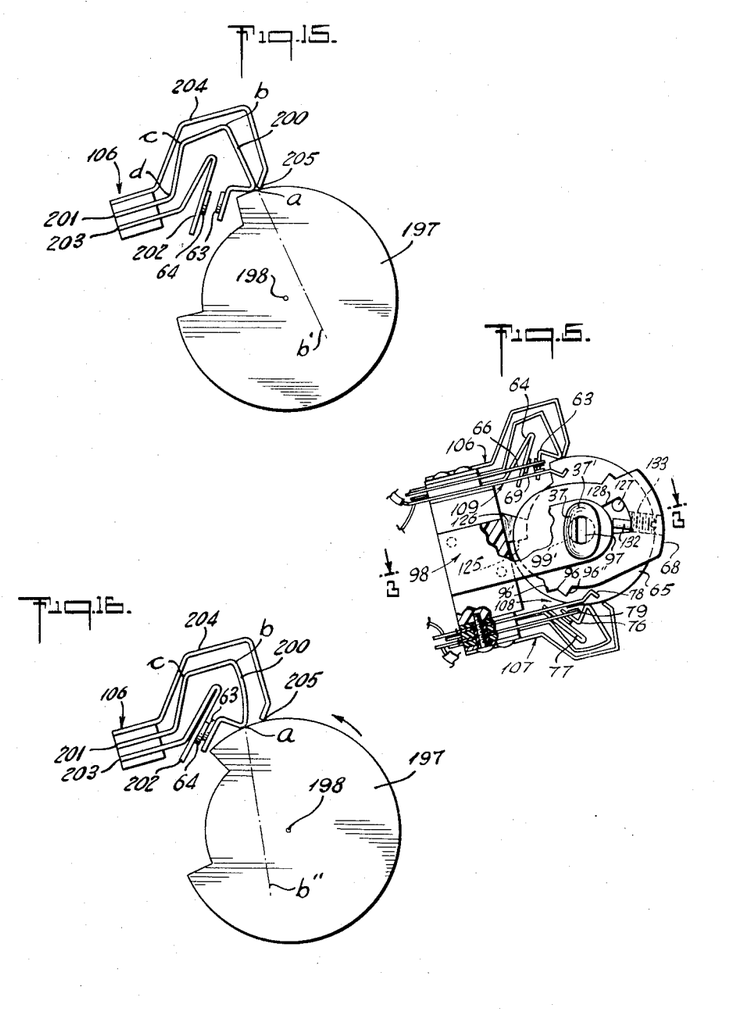
Fig. 5 is an end elevation of the assembled switch shown in Fig. 4.
Figs. 15 and 16 are enlarged diagrammatic views of one of the switches of Fig. 1 to illustrate the operation thereof.

Figs. 15 and 16 show diagrammatically and in enlarged form the structure of the contact assembly 106 (or 107) of the sequence switch 51 and the cooperation of the contacts of this assembly with the circular, cylindrical surface of cam member 65. This switch is an over-center switch wherein the movable arm frictionally engages the cam 65 and, when opened or closed, is moved across a plane radial of the cam 65, or circular member 197.

The contact 63 is carried on the free end of a yieldable sheet metal spring member 200 with its fixed end anchored at 201. This spring member has a relatively sharp, knee or V-shaped portion (a) biased toward the center of the cam by the inherently yieldable material used. It also has an outwardly extending portion a—b and bent portions b—c and c—d which make it possible for the spring member 200 to be partially collapsed or expanded due to frictional engagement of the knee (a) with the disc. The line of thrust is indicated by the line a—b' to the right of center 198. This movement can take place to the right of center 198, or to the left, depending upon the direction of motion of the disk. The relatively fixed contact 64 is carried on a sharply bent yieldable spring member 202 anchored as indicated at 203. The assembly 106 also includes a relatively rigid metal strap 204 which extends around the spring 201 and has its end 205 preferably lightly bearing against the surface of the disk 197 to provide a friction drag. It is normally in such a position that when the disk 197 turns clockwise, it forms a back-stop for the spring member 200 so that the spring member 200 is never free to escape to the right and always presses against the disk 197 with residual force. When the disk 197 (cam 65) turns counterclockwise from the position shown in Figure 15 to that in Fig. 16, the knee (a) of the spring 200 is pushed to the left, distorting the spring 200 so as to bring the angled portions a–b, b—c and c—d closer together and the contact 63 against the contact 64. The line of thrust is now to the left of center 198, as indicated in Fig. 15 by the line a—b''. Continued movement after the contacts have closed the circuit merely causes the cam surface to pass under the knee (a) of the spring 200, thereby maintaining contact pressure. The closing of the circuit has also effected a wiping action between the contacts 63 and 64. Mere stopping of the disk has no effect on the circuit.

On reverse angular movement of the disk 197 (cam 65), the frictional engagement of the knee of the spring 200 with the surface of the cam member is sufficient to carry the spring member in a clockwise direction (Figs. 15 and 16), deforming the spring 200 somewhat so that it is drawn back against the stop 205. During this movement, the switch is opened.

Contact assemblies 108 and 109 cooperating with cam 68 are of conventional construction and the shape of cam 68 is arranged to attain a predetermined switch action in the starting and stopping of an oil burner. This action will be described in connection with Figs. 6 to 14 illustrating the operation of the switch.

Figure 17:
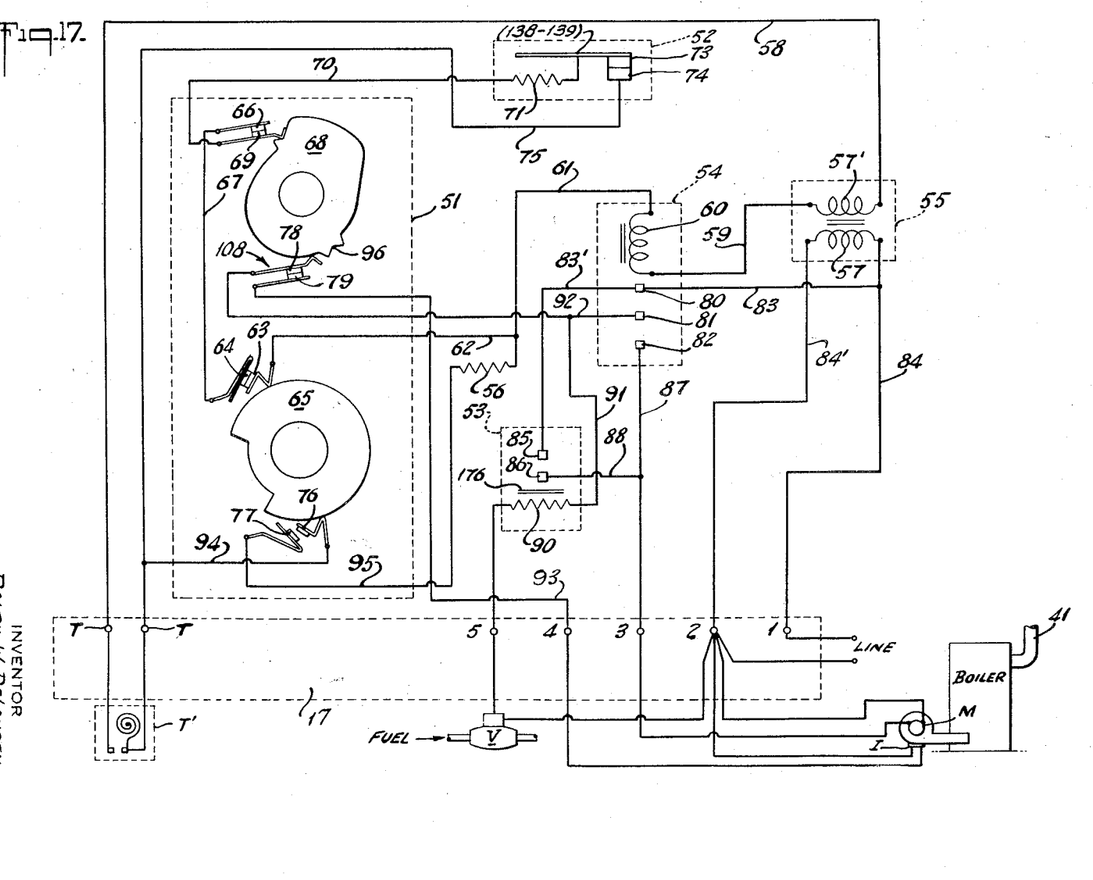
Fig. 17 is a circuit diagram of an oil burner control circuit embodying the switch shown in Fig. 1.

Reference is now made to the circuit diagram of Fig. 17 illustrating the application of the foregoing embodiment of the invention to the control of an oil burner. The insulating terminal strip 17 carries the terminals 1 to 5 inclusive and two terminals labeled T, T for attachment of a thermostat T' or other controlling device, as above described. An alternating current power source is connected to terminals 1 and 2 and energy is then supplied by way of the control to the oil burner motor M through terminals 3 and 2, to the ignition means I through terminals 4 and 2 and to the oil control valve V by means of terminals 5 and 2. Low voltage for control is obtained by means of the transformer 55 which has a primary winding 57 connected within the unit by leads 84 and 84' with the line terminals 1 and 2, and a secondary winding 57'.

Figure 6:
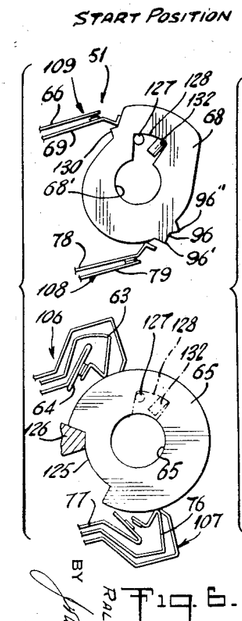
Figs. 6 to 14 are diagrammatic views of the contacts and contact operating elements of the switch mechanism of Fig. 1 showing the sequence of operation for the control of an oil burner.

The thermostat circuit which initiates operation of the burner includes the winding 57' of transformer 55, one side of which is connected through the lead 58 to one of the terminals T. The other side of winding 57' is connected through the lead 59 to one side of the coil 60 of relay 54. The other side of that coil is connected through leads 61 and 62 to movable contact 63 opposite fixed contact 64 and associated with cam 65 of switch 51. Contact 64 is connected to fixed contact 66 by a lead 67. This contact is adjacent cam 68, also part of switch 51 and cooperates with contact 69 by means of lead 70 and a negative temperature coefficient resistor 71 to the temperature responsive structure including the bimetallic elements 138 and 139 of the reset switch 52. Contacting means 73 is electrically coupled to the bimetallic elements 138 and 139 and its cooperating contacting means 74 is connected to the other thermostat terminal T by means of the lead 75. When the terminals T and T are not connected by the thermostat and the entire control is at rest, contacts 63—64 and 66—69 on cam switch 51 are closed and contacting means 73—74 on the reset or safety switch 52 are closed. At the same time, contacts 76—77 opposite cam 65 are open while the contacts 78—79 are closed. For a more accurate disposition of cams 65 and 68 and their associated contacts, reference is made to Figure 6, showing the position thereof when the control is ready to start an oil burner.

Now assuming that a demand for heat is created, a control connected with contacts T—T will be closed and this completes the starting circuit to operate relay 54 and close the three contacts 80, 81 and 82, one to the other. Contact 80 is connected by means of leads 83 and 84 to power line terminal 1. This contact is also connected by lead 83' to contact 85 of the contacts 85, 86 of a motor-after-run control 53. The relay contact 82 is connected to terminal 3 by lead 87 and also to contact 86 of motor control 53 by the lead 88. With this arrangement, closure of the relay contacts energizes the motor M which is connected to terminals 3 and 2. Although the motor on a conventional oil burner drives both the oil pump as well as the blower, this system presupposes the use of a separate oil valve in the fuel line in order to permit initiation of the flow of air on starting but delay the supply of oil. In so doing, the motor will have time to develop appreciable air flow before injection of the fuel. The oil valve receives energy from terminals 5 and 2 at the same time the motor is started. As terminal 5 is connected to the contact 81 of relay 54 through the lead 89, a negative temperature coefficient resistor 90 of the motor-after-run control 54, and leads 91 and 92, and as the resistor 90 has a high value when cold, actuation of relay 54 as described will initially limit current flow to a value below that required to actuate the valve and cause it to open and allow fuel to flow. However, after a short period of time, when the motor has attained substantially maximum speed and established air flow, the resistor 90 heats and its resistance lowers to a point permitting the flow of sufficient current for actuation of the oil valve. Since the air flow with this arrangement is built up to substantially maximum flow before the admission of oil, smoke conditions on starting are substantially entirely eliminated. Only a relatively short delay is required for this purpose and, because of the sensitivity and stability of the control, be precise value thereof is not critical. Accumulated heat from resistor 90 causes bimetal element 176 to close the motor-after-run circuit through contacts 85 and 86 and bypass contacts 80 and 82.

In addition to starting the motor M and energizing the oil valve V on starting, the ignition circuit of the oil burner was also energized inasmuch as the contacts 78, 79 of switch 51 were closed at the time the relay 54 was operated by the thermostat connected to terminals T—T. The ignition circuit within the control includes contact 81 of relay 54, lead 92, contacts 78, 79 and lead 93 to terminal 4.

Figure 7:
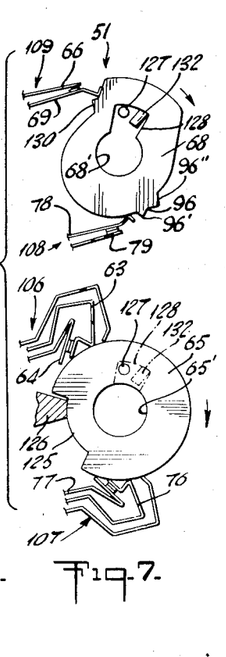
Figure 8:
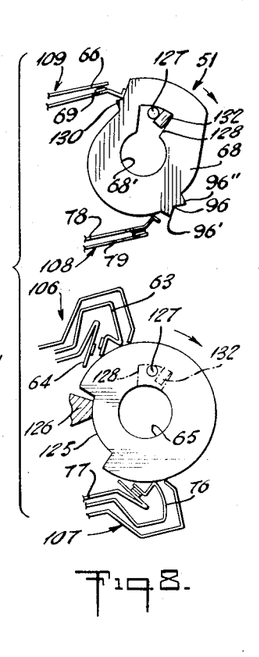

Assuming at this point that the burner ignites properly and that no undesirable conditions arise, the burner will cause a helical bimetallic coil disposed within the stack 41 to become heated and begin to expand or unwind. This will cause clockwise rotation of the shaft 34 as viewed from the rear and move cams 65 and 68 clockwise. This movement actually affects only cam 65, as illustrated in Fig. 7, which is free to move through a predetermined angle relative to cam 68. The purpose for this coupling is evident in part from the description of the circuit and in part from the description of the mechanical aspects of the switch.

This initial movement of cam 65 closes contacts 76, 77 and completes a bypass circuit, including wires 94, 95 and resistor 56 about the contacts 63, 64 and 66, 69 of switch 51 and contacts 73, 74 of the reset switch 52. While this circuit prevents a lock-out condition on opening of the contacts 63, 64, it may be desirable under certain conditions to retain the reset switch in the relay control circuit.

The next step (see also Fig. 8) in the operation of this control consists of further clockwise rotation of cam 65 while cam 68 still remains stationary. This action opens the contacts 63, 64 and introduces the resistor 56 into the circuit, thereby reducing the current through the relay coil. The value of this reduced current, however, is such that the relay will stay closed as described, but, should a power interruption be experienced, the relay 54, upon being even momentarily deenergized, will not pull in again until after the switch 51 is recycled to the start position. The employment of resistor 56 constitutes but one procedure to insure deenergizing of the relay 60 to prevent no actuation in the event of power failure and momentary flame failure until safe starting conditions have been reestablished.

Transferring from the start to the run position is an important factor in preventing false lockouts. Prior controls have required temperature changes of the order of 200° F., or more, for the attainment of this end so that a lock-out could occur after a normally satisfactory start has been effected but wherein the heat generated has failed to act within the required time on the element responsive to stack temperature. With the cam switch in accordance with the invention this changeover to the run position can be attained with a temperature change of less than 100° F. readily produced on a satisfactory start. This temperature change can thus be sensed in such a short time that false lock-outs are effectively prevented.

As the clockwise motion continues (see also Fig. 9), cam 65 starts the rotation of cam 68 to open contacts 66—69 to prevent closure of the initial starting circuit until such time as the cams 65 and 68 are ultimately returned to the starting position after the oil burner has been turned off. Continued heating of the bimetallic element in the stack produces continued rotation of cams 65 and 68 which brings the contact 78 into engagement with the notch 96 of cam 68. Further movement of cam 68 causes the contact 78 to ride past notch 96, whereupon cam 68, by reason of the loose coupling between it and cam 65 will snap forward as shown in the dotted line position of Fig. 10. Contacts 78—79 will now snap open and break the ignition circuit previously described.

Figure 11:
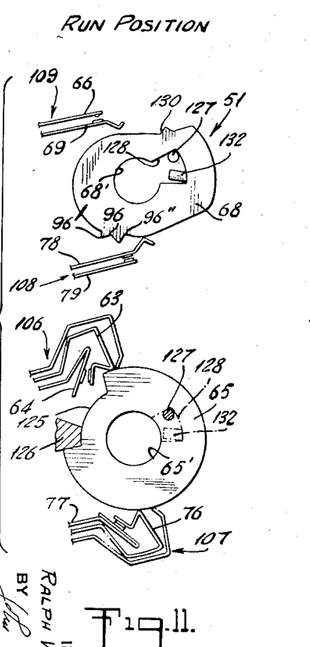

The final run position of the cams and contacts is shown in Figure 11. At this point, the control is in the "run" position and the oil burner will continue until the demand for heat has been satisfied. When this occurs the connection between the terminals T—T is broken. The relay coil 60 is deenergized, and the control is prepared to turn off the burner. Deenergizing of the relay coil 60 opens the contacts 80, 81, 82 which breaks the oil valve circuit and shuts off the fuel. The circuit for the motor M is not broken, for the contacts 85, 86 of the motor after run control 53 had been closed by the bimetallic strip 176 heated by the resistor 90. Upon opening of the relay contacts 80, 81, 82, the motor will continue to run until the bimetallic element 176 of control 53 cools sufficiently to permit contacts 85—86 to open. In so doing, the motor and blower continue to run after the fuel flow has been interrupted. This cools the burner nozzle and furnace fire box and avoids the commonly experienced re-radiation from the fire box walls onto the nozzle which often heats the nozzle to such high temperatures as to permit the accumulation of carbonacious residues on the nozzle. With the present device the oil emitted from the nozzle and oil vapors in the fire box are completely burned without after smoke.

Figure 12:
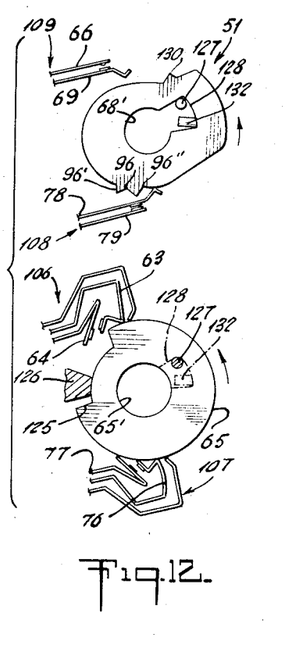
Figure 13:
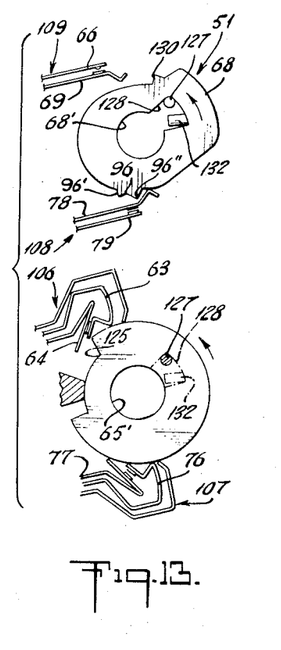
Figure 14:
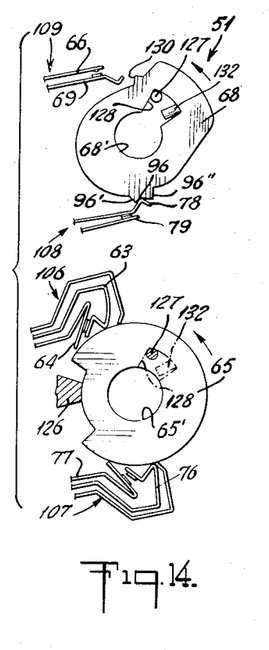

With the burner turned off, the bimetallic element in the stack will start to cool and effect counter clockwise rotation of the cams 65 and 68, as viewed in Fig. 12. On this return, contacts 76—77 first open to break the lock-out circuit, then contacts 63—64 close (Fig. 13) and contacts 78, 79 close, as illustrated in Figure 14. Finally the cams return completely to the start position, as shown in Fig. 6, with contacts 66—69 being the last to close for reestablishment of the starting circuit. Contacts 76—77 forming the lock-out circuit or reset switch by-pass are, of course, in the open condition.

As was evident from the description of the circuit diagram above, the cam switch 51 actuated by the bimetallic element functions to control the sequence of operations to turn the burner on and to turn it off when the requirement for heat has been satisfied. In addition to controlling the sequence of operations, this switch prevents the occurrence of false lock-outs occasioned by failure of the control to by-pass the reset switch 52 substantially immediately upon ignition of the fuel. Another important aspect of this cam switch resides in the provision of means for regulating the ignition "on" time to meet the varied requirements of oil burning equipment, to be described.

Another important aspect of the cam switch resides in the provision of means for preventing re-establishment of the ignition circuit upon flame extinguishment by reason of water or air in the fuel line, power failure or the like. In the present embodiment of the invention this is attained through the cooperation of contact 76 and 77 with cam 65.

From the circuit diagram, Fig. 17, it will be observed that the reset switch 52 can "lock-out" only during the starting period and by reason of an improper start. At all other times improper operation will cause the cam switch to be recycled to the start position whereupon the burner is automatically restarted.

Figure 9:
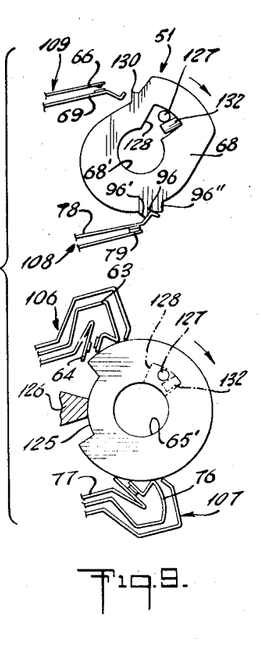
Figure 10:
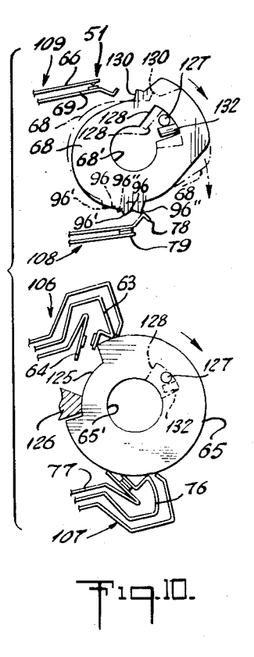

In the operation of the cam switch 51, the relative motion between cams 65 and 68 afforded by the pin and slot drive means is used to control the ignition "on" time. This ignition is controlled by the ignition switch assembly 108, of which contact members 78 and 79 form a part, and are closed in the start position of the switch 51. The V shaped end of contact member 69 is positioned beyond the projection 130 of cam 68 and prevents rotation of the cam until the pin 127 of cam 65 exerts a positive force to move it clockwise (see Figs. 6 and 9 showing the sequence of cam positions as the burner is turned on). While the ignition contacts 78 and 79 are not opened until cam 68 is moved to this "run" position (Fig. 11), this delay results in longer ignition time and is made adjustable by a screw 131 having an offset or eccentric pin 132. Screw 131 threadably engages a substantially radial opening 133 through the cam 68 and is rotatable to move the pin 132 in a manner to vary the lost motion of the pin 127 in slot 128 and hence the play between the cams. This in turn controls the point in the "on" cycle of switch 51 at which the ignition contacts 76 and 77 will be opened to cut off the burned ignition. During the heating of the bimetallic coil in the smoke pipe or stack the cams 65 and 68 are driven clockwise by the clutch and by pin 127 and 132, and the cam 65 has been brought adjacent stop 126 (Figs. 6-10). The V-shaped nose of contact 78 has passed by the first tooth 96' of cam 68 and dropped into notch 96 keeping the circuit closed and has finally climbed over the second tooth 96'' in the cam 68. The end of contact 78 thereupon rides down this tooth 96'', opens the circuit by snap action and causes the cam 68 to shift as shown in dotted lines in Fig. 10 or the full line position of Fig. 11. This brings pin 127 against the back face of the slot 128 and sets the cams in position for the shut down operation of Figures 11 to 14.

When the sequence switch 51 is initially placed in position the shafts 97 and 34 are brought into alignment by turning the knob 49 until tube 37 accepts shaft 34. To insure that the contacts of sequence switch 51 all face the proper way, the knob 49 is turned counter clockwise from the front so as to tension the bimetallic coil. When the knob is released the coil then drives the cams in the other direction, simulating a burner shut down operation and restores the contacts to the position of Fig. 6.

Figure 32:
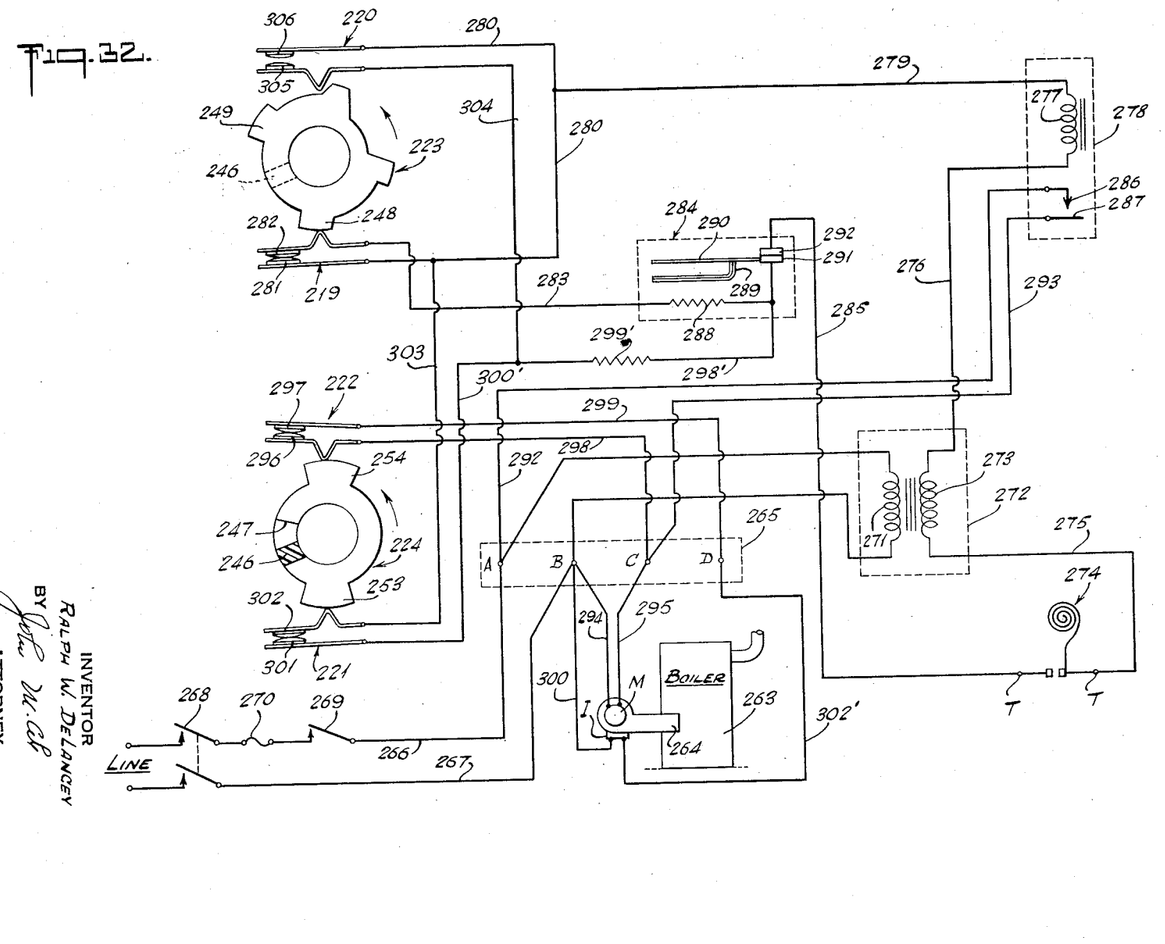
Fig. 32 is a circuit diagram of an oil burner control embodying the sequence switch of Fig. 18.

A modified embodiment of the invention is shown in Figs. 18 to 31 inclusive and a circuit diagram of an oil burner stack control embodying this modified sequence switch is shown in Fig. 32. Referring now to Figs. 18 to 22, the switch is generally denoted by the numeral 210 and embodies an improved structure for adjusting contact pressure and the total rotary motion of the cams for complete cycling of the switch.

More specifically, the switch includes a bifurcated body part 211 having bifurcations 212 and 213 with holes 214 and 215 in line one with the other. This body part may either be formed in one piece or fabricated of two substantially similar halves secured one to the other by screws 216 or other suitable fastening means. The base 217 of the body includes an adjustable screw 218 that cooperates with the angularly movable elements of the switch to be described to limit the total of the angular motion thereof. The side faces of the base part 217 of the body member 211 are provided with slots 217' for receiving and holding the contact assemblies 219, 220, 221 and 222. The bottoms of the slots are shaped to cooperate with their respective contact assemblies and facilitate adjustment of contact pressure in the manner to be discussed in connection with the operation of the switch.

Figure 18:
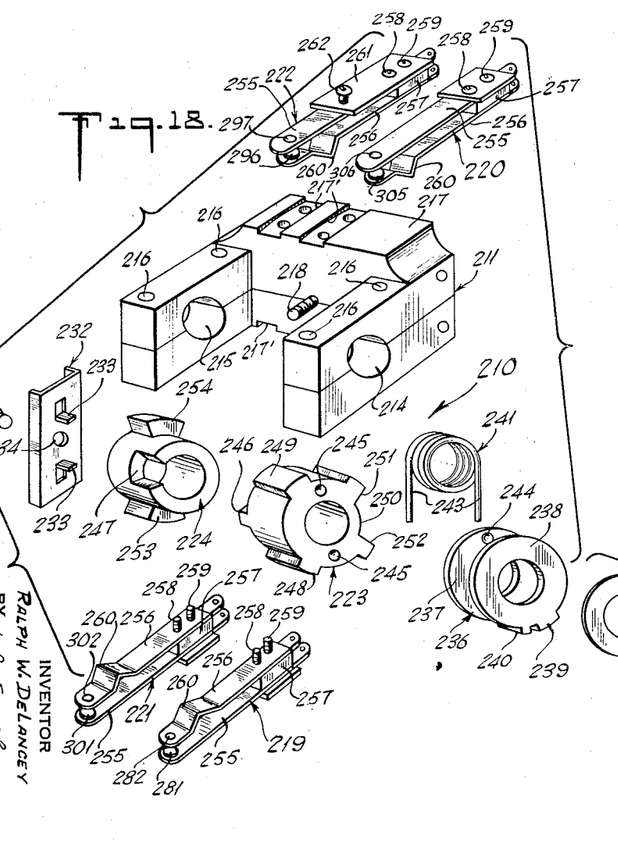
Fig. 18 is an exploded view of another embodiment of a switch in accordance with the invention.
Figure 19:
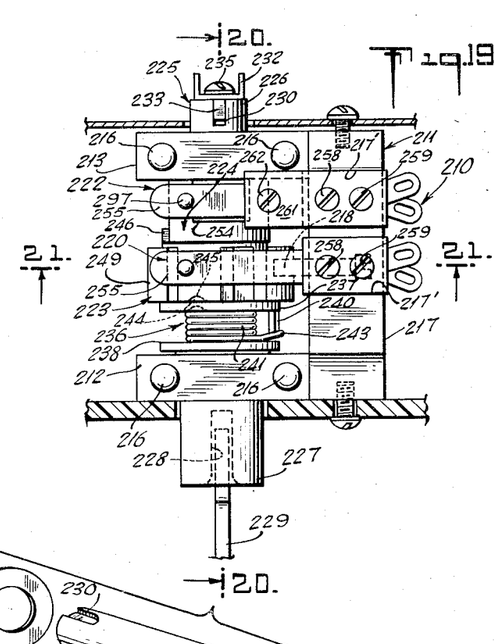
Fig. 19 is a top plan view of the assembled switch shown in Fig. 18 with the parts at the start positions of Fig. 23.
Figure 20:
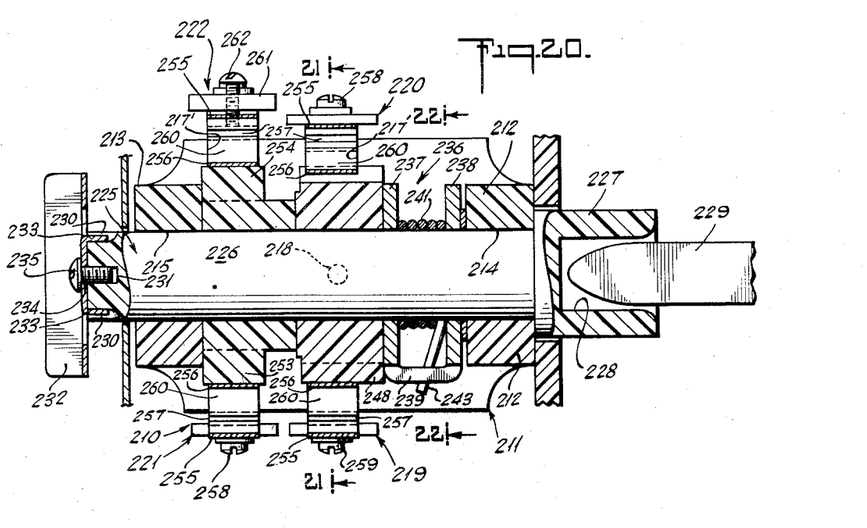
Fig. 20 is a cross-sectional view of Fig. 19 taken along the line 20—20 thereof.

The actuation of the contact assemblies 219 to 222 is accomplished by a pair of cams 223 and 224, mounted to rock on a central shaft 225 having an elongated section 226 adapted to extend through both openings 214 and 215 in the body part 211. The right hand end of the shaft member 225 as viewed in Fig. 18 is enlarged at 227 and provided with an elliptical opening 228 thereof for reception of a driving member 229. This driving member is equivalent to the driving member 34 as shown and described in connection with the embodiment of the invention shown in Figs. 1–18. The outer end of the shaft part 226 is provided with a pair of diametrically disposed slots 230 and a central threaded opening 231 for cooperation with the knob 232. This knob has a pair of lugs 233 that engage the recesses 230 and a central opening 234 through which a screw 235 may be inserted for fixedly securing the knob 232 to the shaft part 226.

Coupling between the shaft 225 and the cams 223 and 224 is accomplished by means of a clutch generally denoted by the numeral 236 and comprising a pair of spaced washers 237 and 238 coupled one to the other by a bridging member 239 to hold them in spaced relationship one to the other. On each side of the bridging member 239 are parallel adjustable clutch members 240 with one member secured to the washer 238 and the other carried by the washer 237. Between the two washer members is a spring 241 having legs 243 disposed on the outer sides of the adjustable members 240. The washers 237 and 238 and spring 241 ride on the central shaft part 226 with the spring 241 frictionally engaging the shaft. The washer member 237 is also provided with a pair of outwardly extending pins 244 which enter into cooperating openings or recesses 245 in one face of the cam member 223 so as to drive the cam member from the clutch. With this arrangement rotation of the shaft 225 will be transmitted through the clutch 236 to the cam member 223 and to cam 224 by means of a relatively narrow projection 246 on the cam 223 and a cooperating, relatively wide arcuate slot 247 in one face of the cam member 224.

The cam 223 has a pair of raised cam surfaces 248 and 249 for operation of contact assemblies 219 and 220, respectively. The cam also includes an arcuate slot 250 defined by the convergent side walls 251 and 252. This slot cooperates with the adjustable screw 218 as may be observed more clearly in Figs. 21 and 23–31, and the position of the screw 218 relative to the cam 223 determines the angular rotation of the cam 223 in response to rotation of the shaft part 226. Thus if the screw 218 is in its innermost position the total movement of the cam is at a minimum while when the screw is in its outermost position the movement of the cam is at a maximum.

The cam 224 which operates the contact assemblies 221 and 222 is provided with a pair of oppositely disposed contact operating surfaces 253 and 254 arranged to cooperate with the contact assemblies 221 and 222 sequentially.

As pointed out above this particular embodiment of the invention is intended for use as a sequence switch in the stack or primary control for an oil burner, and to obtain certain desired functions, the cams 223 and 224 are loosely coupled, that is, the lug 246 of the cam 223 is as above stated made substantially narrower than the slot 247 so that predetermined initial movement must be imparted to the cam 223 before it will initiate a shift of the cam 224. However, as will be shown when rotation of the cam is reversed as when proceeding from the run position to the shut down position of the oil burner both cams move simultaneously in the reverse direction.

Figure 21:
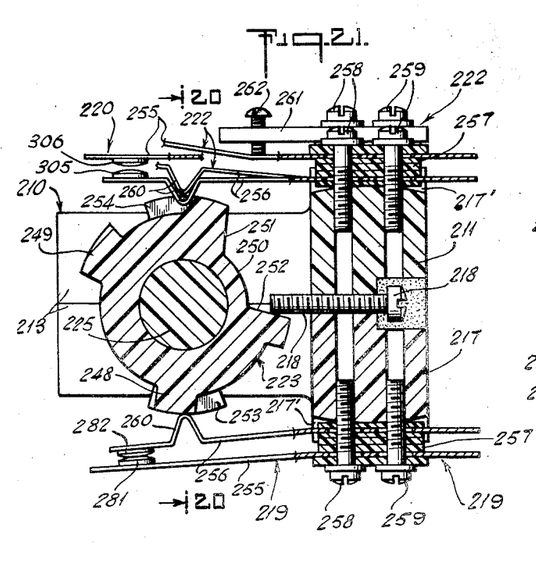
Fig. 21 is a cross-sectional view of Figs. 19 and 20 taken along the line 21—21 thereof.
Figure 22:
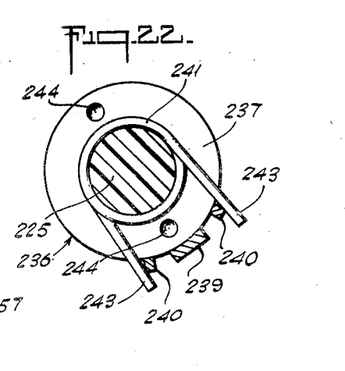
Fig. 22 is a cross-sectional view taken along the line 22—22 of Fig. 20.
Figure 23:
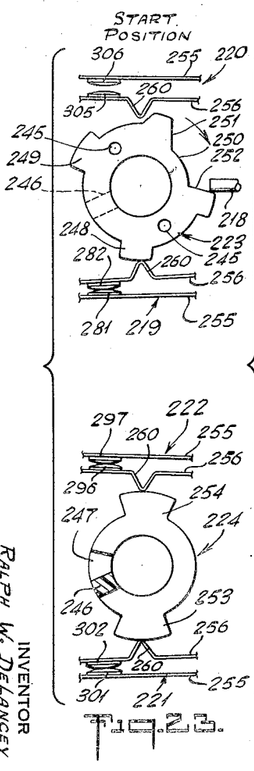
Figs. 23 to 31 are diagrammatic views of the contacts and contact operating elements of the embodiment of the invention shown in Fig. 18 to illustrate the sequence of operation for the control of an oil burner.

The four contact assemblies 219 to 223 are mounted in substantially the same manner as illustrated in Fig. 21 though the contact assembly 222 is provided with an additional adjustment for controlling the contact pressure. Each contact assembly has a pair of contact carrying springs 255 and 256 held in spaced relationship by suitable insulating members 257. Each assembly is secured in a slot 217' of the body 211 by means of a pair of screws 258 and 259. Adjustment of the screw 258 will move the associated contact assembly toward or away from its cam. Each contact carrying member 256 is provided with a V-shaped deformation 260 for cooperation with its associated cam.

Since the contact carrying member 256 of each contact assembly is moved outward to a predetermined position each time it is actuated by its associated cam, it is apparent that as the closing pressure of each contact is varied by adjustment of the screw 258, the friction between the V-shaped portion 260 of each contact assembly and the cam is also varied. However since the frictional engagement of clutch assembly 236 on the shaft is adjustable by varying the tightness of spring 241, the desired contact pressure in each of the contact assemblies 219 to 222 is preferably first adjusted and then the friction of the clutch 236 with the shaft part 226 is adjusted by bending the lugs 240 either inwardly or outwardly of the bridging member 239 in order to provide just sufficient friction between the spring 241 and the shaft part 226 to effect actuation of the contacts with rotation with the shaft part 226. In this way rotation of the shaft through an angle greater than that afforded the cams by reason of the action of the slot 250 in cam 223 and the associated screw 218 will cause the shaft part 225 to slip relative to the clutch 236. This slippage is analogous to that obtained in the structure of Figs. 1–17.

As will become evident from the discussion hereinafter of the circuit diagram of an oil burner control shown in Fig. 32 and the actual sequence of operations of the switch shown in Figs. 23 to 31, the outward or back lash between the cams 223 and 224 determines the period during which the ignition is "on" and the time in the cycle when a pair of safety bypass contacts are opened to place the oil burner in the running position. In addition this back lash together with the shape of the cam lobes 253 and 254 produce rapid action upon opening to reduce arcing and consequent deterioration of the contacts associated with the contact assemblies 221 and 222 actuated by the cam 224.

The contact assembly 222, while mounted and adjusted in a manner similar to the contact assemblies 219, 220 and 221, is provided with an overlying plate 261 carrying a screw 262 bearing against the upper contact member 255 of that assembly. As the screw 262 is moved against the contact carrying member or blade 255 it increases the effort required by the cam 224 to close the associated contacts. This therefore constitutes a fine adjustment of the friction of contact assembly 222 on cam 224. In the case of an oil burner control where the switch is driven by a helical bimetallic member disposed in the stack of the furnace or boiler and responsive to the heat generated by combustion, the effort required on the part of the bimetallic member to move the cam 224 against the action of the contact assemblies 221 and 222 bearing thereon will determine the time and consequently the temperature difference required to cycle the switch from the start position to the "on" position. While this time can be roughly controlled by the combined friction of the contacts 219 through 222 on their respective cam lobes, a fine adjustment of this action is obtained through the utilization of the screw 262 as above described.

Referring now to the circuit diagram shown in Fig. 32 illustrating one circuit utilizing a cam sequence switch of the type shown in Fig. 18 there is illustrated a boiler 263 and an oil burner 264 having among other things an ignition coil I and a motor M. For present purposes it will be assumed that actuation of the motor M functions not only to deliver air into the combustion chamber of the furnace 263 but also to pump oil from a suitable reservoir and discharge it into the combustion chamber for ignition.

The power for the operation of the oil burner 264 and the elements of the control circuit is supplied to terminals A and B on the panel 265 by means of conductors 266 and 267 control switches 268 and 269 together with a safety fuse 270. The power for terminals A and B is supplied to the primary 271 of transformer 272 to provide a relatively low control voltage on the secondary 273 thereof.

The control circuit to start and stop the oil burner 264 includes a thermostat 274 which is connected between the terminals T and T of the control. More specifically, this control circuit includes the thermostat 274, one of the terminals T, conductor 275, transformer secondary 273, conductor 276, coil 277 of relay 278, conductors 279 and 280 to the contacts 281 and 282 of the contact assembly 219, conductor 283 to the reset switch 284 and the conductor 285 to the other terminal T.

With this arrangement and with the cams 223 and 224 in the start position as illustrated in this diagram, when the contacts of thermostat 274 are closed energy from the transformer 273 will be applied immediately to the relay 278 tending to close its contacts 286 and 287. The reset switch 284 in the starting circuit may be of any suitable design, though it preferably includes a negative temperature coefficient resistor 288 arranged to heat a bimetallic thermostatic element 289. The current drawn by the relay 278 causes this resistor 288 to heat. Since its resistance is high initially, its initial current will be low and initial temperature momentarily is unchanged, but as the temperature of the resistor rises, its resistance decreases whereby additional current raises the temperature level. The increase in current allows the relay to close, thus closing its contacts 286 and 287. The heat from the resistor tends to cause the bimetallic element 289 to deflect away from the contact carrying member 290 whereby the contacts 291 and 292 may open. Such opening occurs in the event the oil burner fails to start properly and operate the sequence switch including the cams 223 and 224 to bypass the resistor 288. The start position of the cams 223 and 224 of the sequence switch 210 is also illustrated in Fig. 32 of the drawings.

The closure of the relay contacts 286 and 287 as described above applied energy from terminal A through the conductor 292 to contact 286 and then via contact 287 and conductor 293 to the terminal C. Since one side of the motor M is connected to terminal B by conductor 294 and the other side of the motor is connected to terminal C by conductor 295 the closure of the contact 286 and 287 will cause the motor M to be operated. In addition it will be observed that the contacts 296 and 297 of the contact assembly 222 are in the closed position and are connected between the terminals C and D by means of conductors 298 and 299. One side of the ignition coil I is connected to terminal B by a conductor 300 and the other side is connected to terminal D by the conductor 302'. Thus closure of the relay contacts 286 and 287 also applies ignition to the oil burner.

It will be observed in Figs. 23 through 27 that the cams 223 and 224 are moved in a clockwise direction from the start position to the run position as viewed in these figures and on the circuit diagram and that in the start position the lug 246 of the cam 223 is against the bottom side of the slot 247 so that the cam 223 must move through an angle determined by the length of the slot 247 before the cam 224 is moved. When the oil burner is properly ignited the temperature is increased in the boiler thereby actuating the helical bimetallic member and causing it to turn shaft 225 and through clutch 236 turn cam 223. The first action (see Fig. 24) on the part of the cam 223 is the opening of the contacts 281 and 282 of the switch assembly 219. While these contacts are in series with the low voltage starting circuit their separation is ineffective to cause the burner to shut down, because of a bypass circuit. The bypass circuit includes wire 298', resistor 299', wire 300', contacts 301, 302 of assembly 221, and wire 303. The resistor 299' is of a sufficiently high value to prevent operation of the relay 279 should contacts 281 and 282 be opened, but will provide sufficient current to maintain the relay 278 in the closed position once it has been actuated. A second bypass for the resistor 288 of the reset switch 284 is provided by the conductor 298', resistor 299', conductor 304, contacts 305 and 306 of the contact assembly 220 and conductors 280 and 279 to the relay 278.

Figure 24:
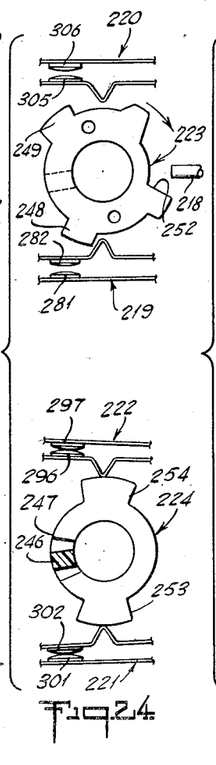
Figure 25:
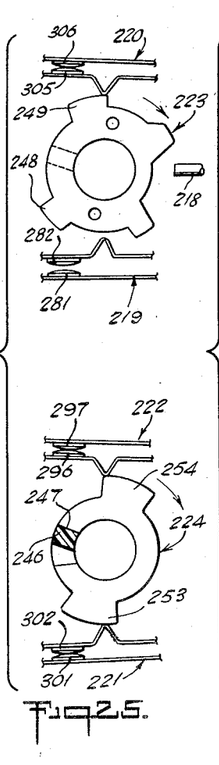
Figure 26:
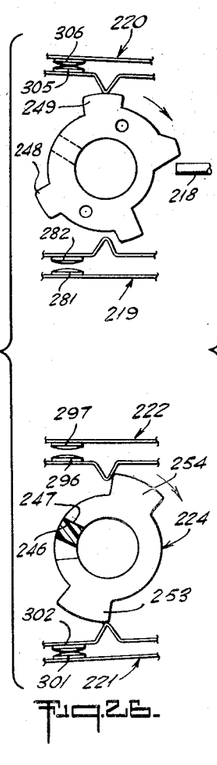
Figure 27:
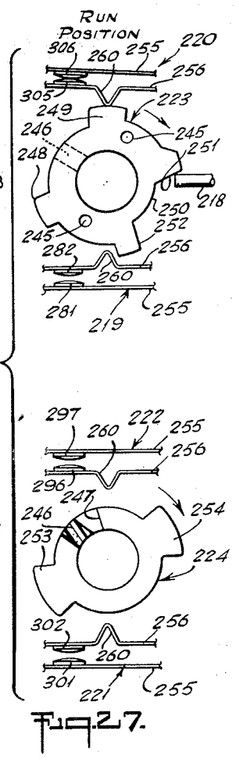
Figure 28:
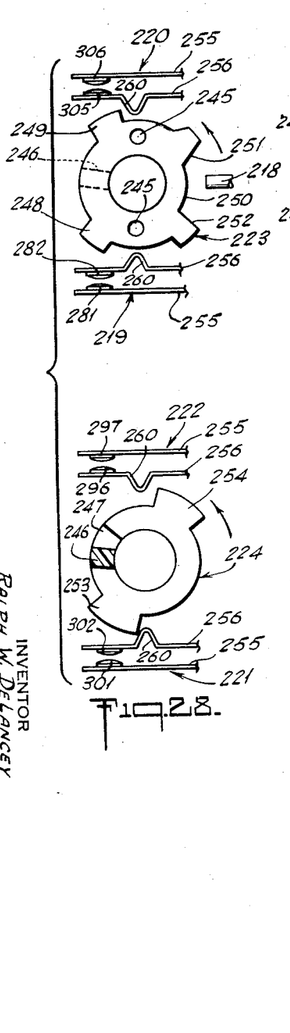
Figure 29:
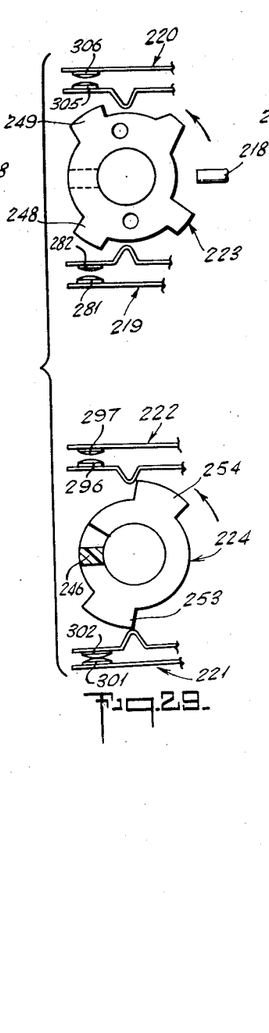
Figure 30:
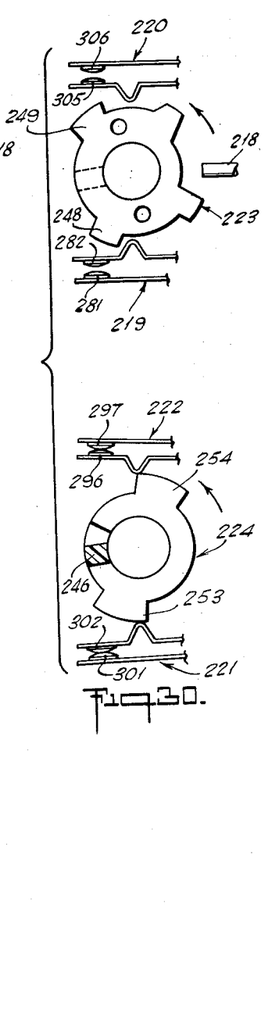
Figure 31:
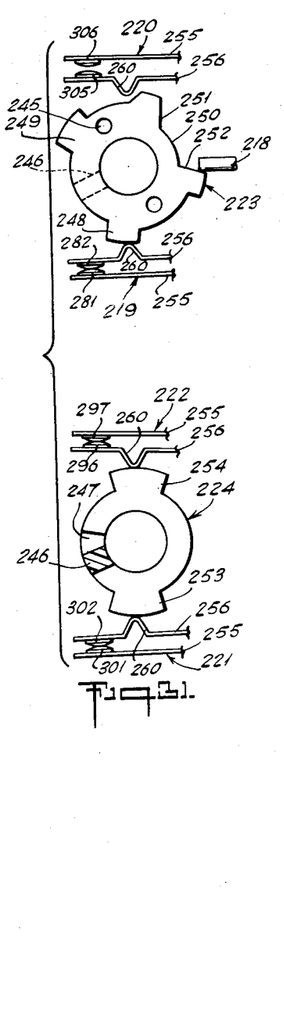

Fig. 24 of the drawings shows the position of the cams after the oil burner has been started and properly ignited. The contact assemblies 219 and 220 are now both in the open position and the contact assemblies 221 and 222 are closed. As the cam 223 continues to rotate its lobe 249 it closes the contact assembly 220 as shown in Fig. 25. This completes the alternate bypass between the series resistor 299' and the conductor 279 to hold the relay 278 in the closed position. Note at this point (Fig. 25) the lug 246 of the cam 223 has engaged the cam 224 and has produced rotation thereof in a clockwise direction. Continued rotation of the cam 223 maintains a contact assembly 220 in the closed position and causes the contact assembly 222 to be opened as shown in Fig. 26. This opens the ignition circuit between the terminals B and D of the terminal strip or panel 265. The action of the contact carrying member 256 of the contact assembly 222 on the trailing edge of the cam lobe 254 urges cam 224 in a clockwise direction in advance of the cam 223. This causes the contact assembly 221 to be opened and its action further accelerates the rotation of the cam 224 as shown in Fig. 27. Thus in the run position of the oil burner the contact assembly 220 is in the closed position and both cams 223 and 224 are advanced to their extreme clockwise positions, as determined by the adjustment of screw 218. When the demand for heat has been satisfied the thermostat 274 is opened and the relay 278 is deenergized. Both cams 223 and 224 then simultaneously start to move in a counter clockwise direction due to the cooling of the helical bimetallic driving element. This motion is shown in Fig. 28. Continued counter rotation initially closes the contact assembly 221 as shown in Fig. 29 and then the contact assembly 222 as shown in Fig. 30. Upon return to the start position (Figs. 31 and 23) the contact assembly 219 is also closed.

By properly adjusting the width of the lobes 248 and 249 on cam 223 and lobes 253 and 254 on cam 224 and coordinating them with the arcuate slot 240 and stop screw 218, the total angular motion of the cams can be controlled without affecting sequential operation of the switch. In this way the temperature range over which the switch will function to completely cycle the burner from start position to the run position and then back to the start position can be adjusted to meet desired conditions. Moving the screw 218 outwardly will extend the temperature range for complete cycling while moving it inwardly will shorten the temperature range for cycling. In addition the switch functions on the basis of a relative change in temperature rather than an absolute temperature value so that if a burner has been running it is not necessary, after it has been shut down, to permit the furnace to cool off fully before it can be restarted. The burner can be restarted at any time after the stack temperature has dropped in temperature an amount required to rotate the switch back to the start position. Any further cooling of the helical bimetallic member merely produces slip of the shaft 226 relative to the clutch 236 as previously described.

While only certain embodiments of the invention have been shown and described, it is apparent that other alterations, modifications and changes may be made without departing from the true scope and spirit thereof.

I claim:

1. In a rotary cam switch having at least one rotary cam and a switch actuated by rotation of said cam, said switch comprising at least two contact carrying members, an adjustable cantilever mount for said members with one of said members being actuated by said cam to open and close the contacts, said mount including means for moving both members toward and away from said cam to adjust the frictional contact of one of said members with the cam.

2. In a rotary switch having at least one rotary cam and a switch actuated by said cam according to claim 1 wherein means are included for adjustably positioning said members one relative to the other to finely adjust the friction of said members on the cam when the switch is in the closed position.

3. A switch comprising, fixed and movable switch members and a movable member having a surface in which the movable switch member bears, said movable switch member having a shifting means frictionally contacting said surface and being transported with said surface from a position in contact with said fixed switch member to a position spaced from said fixed switch member, and wherein the friction between the shifting means and said surface attains a maximum when between said positions.

4. A switch comprising a reciprocable member, a movable switch arm including a contact actuated thereby and movable in the plane of motion of said member, means frictionally coupling said movable switch arm with the surface of said member and a fixed contact associated with the first contact whereby movement of said reciprocable member in one direction will close said contacts and movement in the other direction will open said contacts.

5. A switch comprising a member movable in at least one plane, a fixed contact, a cooperating contact movable into and out of engagement with the first contact, and actuating means for said cooperating contact in pressure engagement with the surface of said member and movable in response to movement of said member through a point wherein the pressure of said actuating means is applied substantially perpendicularly to the surface of said member, said fixed contact being positioned to one side of said point whereby movement of the member in one direction will operate to close said contacts and reversal of motion of said member will operate to open said contacts.

6. Means for adjustably supporting an elongated contact carrying member comprising a mount for said member with a mounting surface formed of at least two portions reversely inclined relative to the plane of said member and at least two fastening means securing said member to said reversely inclined surfaces with one of said fastening means holding said member in adjusted relation with the inclined portion of said surface remote from said contact and the other fastening means holding said member in adjusted relation with the inclined portion of said surface near said contact.

7. In a switch a pair of resilient elongated contact carrying members, means cooperating with said members for opening and closing said contacts, and a mount for said contact carrying members for holding them in cooperating relationship with said operating means, said mount including a surface having ridge defining portions of reversed slope relative to said contact carrying members and at least two fastening means for securing said members against said surface with one of said fastening means at least partially engaging the sloping portion of said surface remote from said contacts and the other of said fastening means engaging the sloping portion of said surface near said contacts, said fastening means being adjustable to modify the position of said contact carrying members relative to said cooperating means.

8. In a switch according to claim 7, wherein said surface comprises two planes with a ridge portion at the intersection thereof, said ridge being disposed adjacent the fastening means remote from said contacts.

References Cited in the file of this patent

UNITED STATES PATENTS

| | | |
|---|---|---|
| Re. 22,131 | Lindemann | July 7, 1942 |
| 1,961,778 | Pauling | June 5, 1934 |
| 2,091,161 | Rubel | Aug. 24, 1937 |
| 2,103,792 | Peterson et al. | Dec. 28, 1937 |
| 2,190,682 | Satterlee | Feb. 20, 1940 |
| 2,576,836 | Hilsinger | Nov. 27, 1951 |
| 2,670,039 | Burkholder | Feb. 23, 1954 |
| 2,748,204 | Woods et al. | May 29, 1956 |